United States Patent
Berg et al.

(10) Patent No.: US 6,598,120 B1
(45) Date of Patent: Jul. 22, 2003

(54) ASSIGNMENT OF BUILDING BLOCK COLLECTOR AGENT TO RECEIVE ACKNOWLEDGMENTS FROM OTHER BUILDING BLOCK AGENTS

(75) Inventors: Thomas B. Berg, Beaverton, OR (US); Bruce M. Gilbert, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/683,989

(22) Filed: Mar. 8, 2002

(51) Int. Cl.[7] ............................................... G06F 12/08
(52) U.S. Cl. ...................................... 711/121; 711/144
(58) Field of Search ................................... 711/121, 144, 711/148; 709/237

(56) References Cited

U.S. PATENT DOCUMENTS

| | | | | |
|---|---|---|---|---|
| 5,749,095 A | * | 5/1998 | Hagersten | 711/141 |
| 5,875,462 A | * | 2/1999 | Bauman et al. | 711/119 |
| 6,138,217 A | * | 10/2000 | Hamaguchi | 711/141 |
| 6,209,065 B1 | * | 3/2001 | Van Doren et al. | 711/150 |
| 6,226,714 B1 | | 5/2001 | Safranek et al. | |
| 2001/0013089 A1 | * | 8/2001 | Weber | 711/146 |
| 2001/0051977 A1 | * | 12/2001 | Hagersten | 709/203 |

OTHER PUBLICATIONS

Gharachorloo, Kourosh; Sharma, Madhu; Steely, Simon; and Van Doren, Stephen, "Architecture and Design of AlphaServer GS320", ASPLOS 2000, Nov. 12–15, 2000.

* cited by examiner

*Primary Examiner*—Hiep T. Nguyen
(74) *Attorney, Agent, or Firm*—Law Offices of Michael Dryja (57) ABSTRACT

Assigning a building block collector agent to receive acknowledgments from other building block agents is disclosed. A memory-line request is received from a requestor agent that is one of a number of agents. Each agent has a shared memory to share among the agents, as well as a cache to temporarily store a limited number of memory lines of the shared memories of the other agents. A collector agent, which is one of the agents, is dynamically assigned for receiving acknowledgments from the agents. This dynamic assignment is based on the type of memory line-related request, and/or the global state of the caches of the agents.

20 Claims, 8 Drawing Sheets

| Request | Global State | Resp to Req | Req to Home | Req to Sharers | Req to Owner | Next Global State | Rollout |
|---|---|---|---|---|---|---|---|
| LCR | Invalid | GO | - | - | - | n/c | NO |
| LCR | Shared Miss | GO | - | - | - | n/c | NO |
| LCR | Dirty Miss | WAIT | - | - | RCR | Shared Miss | NO |
| LCR | Mod Miss | WAIT | - | - | RCRI | Invalid | NO |
| RCR | Invalid | WAIT | LCR | - | - | Shared Hit | YES |
| RCR | Shared Miss | WAIT | LCR | - | - | Shared Both | YES |
| RCR | Shared Hit | GO | - | - | - | n/c | NO |
| RCR | Shared Both | GO | - | - | - | n/c | NO |
| RCR | Dirty Miss | WAIT | - | - | RCR | Dirty Both | YES |
| RCR | Dirty Hit | GO | - | - | - | n/c | NO |
| RCR | Dirty Both | GO | - | - | - | n/c | NO |
| RCR | Dirty Mod | GO | - | - | - | n/c | NO |
| RCR | Mod Miss | WAIT | - | - | RCR | Dirty Hit | YES |
| RCR | Mod Hit | GO | - | - | - | n/c | NO |
| LCRI | Invalid | GO | - | - | - | n/c | NO |
| LCRI | Shared Miss | GO inv=n | - | n*RCI | - | Invalid | NO |
| LCRI | Dirty Miss | WAIT inv=n | - | n*RCI | RCRI | Invalid | NO |
| LCRI | Mod Miss | WAIT | - | - | RCRI | Invalid | NO |
| RCRI | Invalid | WAIT | LCRI | - | - | Mod Hit | YES |
| RCRI | Shared Miss | WAIT inv=n | LCRI | n*RCI | - | Mod Hit | YES |
| RCRI | Shared Hit | GO inv=1 | LCI | - | - | Mod Hit | NO |
| RCRI | Shared Both | GO inv=n+1 | LCI | n*RCI | - | Mod Hit | NO |
| RCRI | Dirty Miss | WAIT inv=n | - | n*RCI | RCRI | Mod Hit | YES |
| RCRI | Dirty Hit | GO inv=1 | - | - | RCI | Mod Hit | NO |
| RCRI | Dirty Both | GO inv=n+1 | - | n*RCI | RCI | Mod Hit | NO |

FIG 6

| Request | Global State | Resp to Req | Req to Home | Req to Sharers | Req to Owner | Next Global State | Rollout | |
|---|---|---|---|---|---|---|---|---|
| LUR | Invalid | GO | - | - | - | n/c | NO | ⎫ |
| | Shared Miss | GO | - | - | - | n/c | NO | ⎬ 602 |
| | Dirty Miss | WAIT | - | - | RUR | n/c | NO | |
| | Mod Miss | WAIT | - | - | RUR | n/c | NO | ⎭ |
| RUR | Invalid | WAIT | LUR | - | - | n/c | NO | ⎫ |
| | Shared Miss | WAIT | LUR | - | - | n/c | NO | |
| | Shared Hit | GO | - | - | - | n/c | NO | |
| | Shared Both | GO | - | - | - | n/c | NO | |
| | Dirty Miss | WAIT | - | - | RUR | n/c | NO | ⎬ 604 |
| | Dirty Hit | GO | - | - | - | n/c | NO | |
| | Dirty Both | GO | - | - | - | n/c | NO | |
| | Dirty Mod | GO | - | - | - | n/c | NO | |
| | Mod Miss | WAIT | - | - | RUR | n/c | NO | |
| | Mod Hit | GO | - | - | - | n/c | NO | ⎭ |

| Request | Global State | Resp to Req | Req to Home | Req to Sharers | Req to Owner | Next Global State | Rollout |
|---|---|---|---|---|---|---|---|
| LUW (partial) | Invalid | GO | - | - | - | n/c | NO |
| | Shared Miss | GO inv=n | - | n*RCI | - | Invalid | NO |
| | Dirty Miss | WAIT inv=n | - | n*RCI | RCRI | Invalid | NO |
| | Mod Miss | WAIT | - | - | RCRI | Invalid | NO |
| RUW (partial) | Invalid | WAIT | LRMW | - | - | n/c | NO |
| | Shared Miss | WAIT inv=n | LRMW | n*RCI | - | Invalid | NO |
| | Shared Hit | GO inv=1 | LCI | - | - | Mod Hit | NO |
| | Shared Both | GO inv=n+1 | LCI | n*RCI | - | Mod Hit | NO |
| | Dirty Miss | WAIT inv=n | LWB | n*RCI | RCRI | Invalid | NO |
| | Dirty Hit | GO inv=1 | - | - | RCI | Mod Hit | NO |
| | Dirty Both | GO inv=n+1 | - | n*RCI | RCI | Mod Hit | NO |
| | Dirty Mod | GO inv=n | - | n*RCI | - | Mod Hit | NO |
| | Mod Miss | WDAT | LWB | - | RCRI | Invalid | NO |
| | Mod Hit | GO | - | - | - | n/c | NO |
| LUW (full line) | Invalid | GO | - | - | - | n/c | NO |
| | Shared Miss | GO inv=n | - | n*RCI | - | Invalid | NO |
| | Dirty Miss | GO inv=n+1 | - | n*RCI | RCI | Invalid | NO |
| | Mod Miss | GO inv=1 | - | - | RCI | Invalid | NO |
| RUW (full line) | Invalid | WAIT inv=1 | LUW | - | - | n/c | NO |
| | Shared Miss | WAIT inv=n+1 | LUW | n*RCI | - | Invalid | NO |
| | Shared Hit | GO inv=1 | LCI | - | - | Mod Hit | NO |
| | Shared Both | GO inv=n+1 | LCI | n*RCI | - | Mod Hit | NO |
| | Dirty Miss | WAIT inv=n+1 | LWB | n*RCI | RCI | Invalid | NO |
| | Dirty Hit | GO inv=1 | - | - | RCI | Mod Hit | NO |
| | Dirty Both | GO inv=n+1 | - | n*RCI | RCI | Mod Hit | NO |
| | Dirty Mod | GO inv=n | - | n*RCI | - | Mod Hit | NO |
| | Mod Miss | WAIT inv=1 | LWB | - | RCI | Invalid | NO |
| | Mod Hit | GO | - | - | - | n/c | NO |

FIG 8

| Request | Global State of Y | Req to Home | Req to Instig. | Req to Sharers | Req to Owner | Next Global State of Y |
|---|---|---|---|---|---|---|
| request of line X instigates RC rollout of line Y | Shared Hit | CI | RCI | - | - | Invalid |
| | Shared Both | CI | RCI | - | - | Shared Miss |
| | Dirty Hit | - | RCI | - | CI | Mod Miss |
| | Dirty Both | - | RCI | - | CI | Dirty Miss |
| | Dirty Mod (>1 sharer) | - | RCI | CI to new owner | - | Dirty Miss |
| | Dirty Mod (1 sharer) | - | RCI | CI to new owner | - | Mod Miss |
| | Mod Hit | LWB | RCRI | - | - | Invalid |

ASSIGNMENT OF BUILDING BLOCK COLLECTOR AGENT TO RECEIVE ACKNOWLEDGMENTS FROM OTHER BUILDING BLOCK AGENTS

BACKGROUND OF INVENTION

This invention relates generally to multi-processor computer systems, and more particularly to such systems in which there are a number of building blocks and each building block has one or more agents.

There are many different types of multi-processor computer systems. A symmetric multi-processor (SMP) system includes a number of processors that share a common memory. SMP systems provide scalability. As needs dictate, additional processors can be added. SMP systems usually range from two to thirty-two or more processors. One processor generally boots the system and loads the SMP operating system, which brings the other processors online. Without partitioning, there is only one instance of the operating system and one coherent shared memory space. The operating system uses the processors as a pool of processing resources, all executing simultaneously, where each processor either processes data or is in an idle loop waiting to perform a task. SMP systems increase in speed whenever processes can be overlapped.

A massively parallel processor (MPP) system can use thousands or more processors. MPP systems use a different programming paradigm than the more common SMP systems. In an MPP system, each processor contains its own memory and copy of the operating system and application. Each subsystem communicates with the others through a high-speed interconnect. To use an MPP system effectively, an information-processing problem should be breakable into pieces that can be solved simultaneously. For example, in scientific environments, certain simulations and mathematical problems can be split apart and each part processed at the same time.

A non-uniform memory access (NUMA) system is a multi-processing system in which memory is separated into distinct banks. NUMA systems are similar to SMP systems. In SMP systems, however, all processors access a common memory at the same speed. By comparison, in a NUMA system, memory on the same processor board, or in the same building block, as the processor is accessed faster than memory on other processor boards, or in other building blocks. That is, local memory is accessed faster than distant shared memory. NUMA systems generally scale better to higher numbers of processors than SMP systems. The term building block is used herein in a general manner, and encompasses a separable grouping of processor(s), other hardware, such as memory, and software that can communicate with other building blocks.

A difficulty with nearly any type of multi-processor computer system that includes caches for memory shared among the building blocks is that, for optimal and/or proper performance of the system, cache and/or memory coherence should be maintained. Coherence means that when a processor of any of the building blocks processes a memory line, the correct value in that memory line is maintained. This is difficult to ensure, because many copies of the memory line may exist within the system. There is the home memory line, stored in the local shared memory of one of the building blocks. There may also be one or more copies of the memory line stored in different caches of the building blocks of the system. Because the processors of a multi-processor system may use the same memory lines at almost the same time, it is important to let them know as soon as possible about changes to the memory lines that they are caching or that they are responsible for in their local shared memories. Otherwise, "stale" data may result, where a processor reads the incorrect value for a memory line.

For example, a memory line may be cached in a number of different caches of the multi-processor system. If one of the processors changes the data stored in the memory line in its cache, then the other processors should invalidate the memory line in their caches, if it is in fact stored there. That is, the other processors should ensure that they do not use the data stored in the memory line in their caches. However, to ensure that the process is completed properly, and that all the other processors have invalidated the memory line in their caches, these processors should send acknowledgments of the invalidation request for collection by an entity. Within the prior art, though, there is no manner by which to dynamically assign which processor should be responsible for collecting such acknowledgments. For this described reason, as well as other reasons, therefore, there is a need for the present invention.

SUMMARY OF INVENTION

The invention relates to assigning a building block collector agent to receive acknowledgments from other building block agents. In a method of the invention, a memory-line request is received from a requestor agent that is one of a number of agents. Each agent has a shared memory to share among the agents, as well as a cache to temporarily store a limited number of memory lines of the shared memories of the other agents. The method dynamically assigns a collector agent, which is also one of the agents, for receiving acknowledgments from the agents. This dynamic assignment is based on the type of memory line-related request, and/or the global state of the caches of the agents.

A system of the invention includes building blocks and an interconnect that interconnects the building blocks. Each building block has an agent, a shared memory, and a cache. The shared memories are shared among the agents of the building blocks. The cache of an agent temporarily stores a limited number of memory lines of the shared memories of the other agents. The interconnect includes a manager to dynamically assign a collector agent among the agents for receiving acknowledgments from the agents. This dynamic assignment is based on the type of a memory line-related request, and/or the global state of the caches of the building blocks.

An article of manufacture includes a computer-readable medium and means in the medium. The means in the medium is for dynamically assigning a collector agent among a number of agents to receive acknowledgments from the agents. This dynamic assignment is based on the type of a memory line-related request, and/or the global state of the caches of the building blocks. Other features and advantages of the invention will become apparent from the following detailed description of the presently preferred embodiment of the invention, taken in conjunction with the accompanying drawings.

DETAILED DESCRIPTION

Overview

Figure 1:
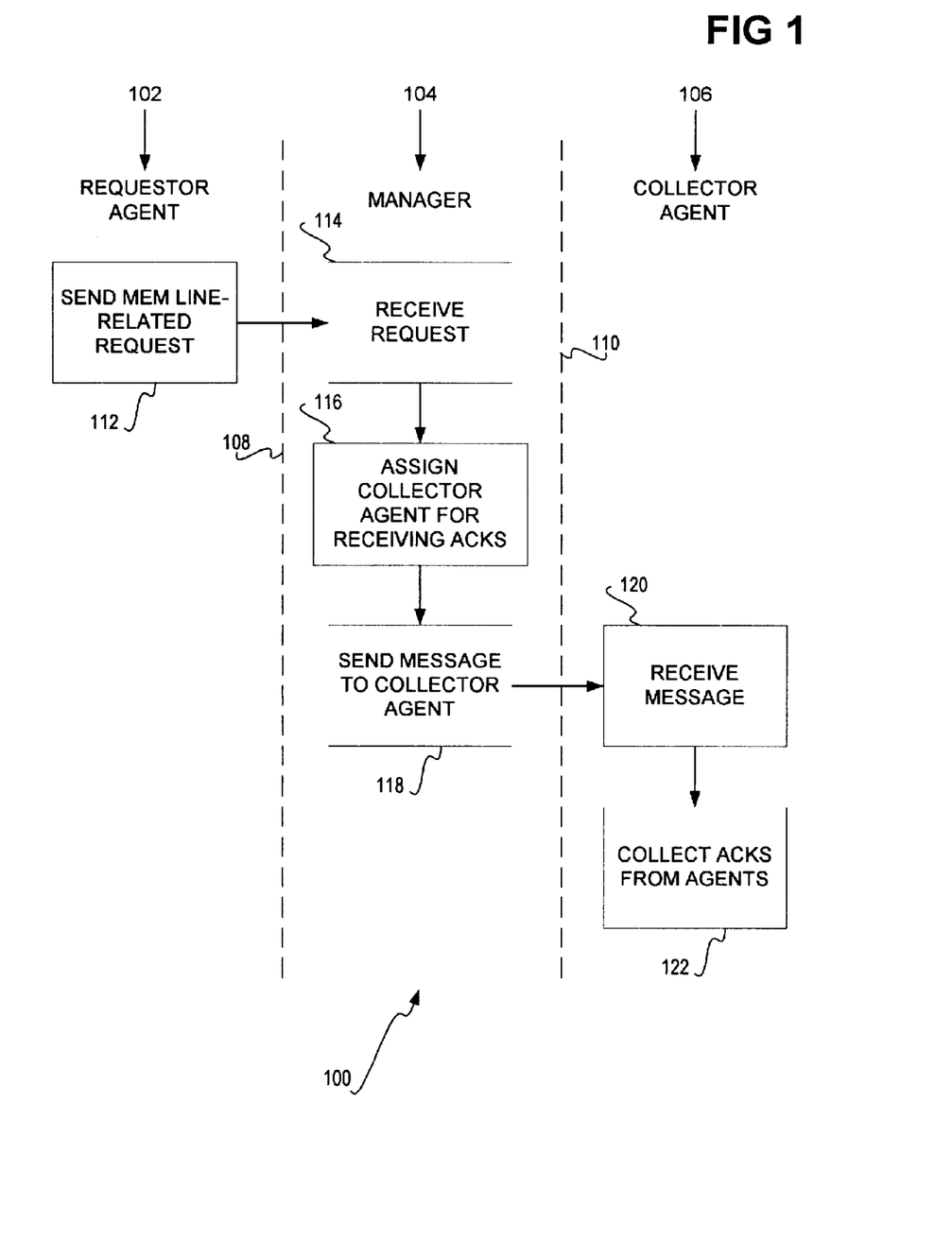
FIG. 1 is a flowchart of a method according to a preferred embodiment of the invention, and is suggested for printing on the first page of the patent.

FIG. 1 shows a method 100 according to a preferred embodiment of the invention. A manager and various agents of a multi-processor system perform the method 100. The manager is preferably part of an interconnect that interconnects building blocks on which the agents reside. Each building block, and thus each agent, has an associated shared memory shared with the other building blocks and agents, and a cache for caching memory lines of the shared memories of the other building blocks and agents. As indicated by the columns 102, 104, and 106, as separated by the dotted lines 108 and 110, a requestor agent, a manager, and a collector agent specifically perform the method 100.

Parts of the method 100 may be implemented as means within a computer-readable medium of an article of manufacture. For example, 114, 116, and 118 may be implemented as such means within a computer-readable medium readable by the manager. The computer-readable medium may be a recordable data storage medium, such as a floppy disk, a CD-ROM, a hard disk drive, and so on, as well as a modulated carrier signal. Furthermore, the method 100 may also include other steps and/or acts, but only those steps and/or acts that preferably illustrate performance of the method 100 are explicitly depicted in FIG. 1.

The requestor agent first sends a memory line-related request to the manager (112). For instance, the request may be a write request, indicating that the requestor agent wishes to write to a particular memory line of the shared memories of the agents. The request may also be a read-invalidate request, indicating that the requestor agent wishes to read from a particular memory line, and wishes to invalidate the storage of this memory line in any of the caches of the agents. The request may be a different type of memory line-related request as well. The manager then receives this request (114).

The manager assigns a collector agent that is to receive acknowledgments ultimately related to the request (116). The acknowledgments are received to ensure cached and shared memory coherence of the multi-processor system. For instance, in response to a read-invalidate request, the manager may indicate in another request to other agents caching the memory line to which the request sent in 112 and received in 114 is related that they must invalidate the memory line in their caches. Once these agents perform the requested operation, they acknowledge such performance by sending an acknowledgment to the collector agent as dynamically assigned by the manager.

Preferably, the assignment of a collector agent is based on at least one of two items, the type of the memory-line related request, and the global state of the caches of the agents. The type of the memory-line related request may be the type of the request sent in 112 and received in 114, such as a write request, a read-invalidate request, and so on. In either of these cases, the manager assigns the requester agent having sent the request in 112 as the collector agent. That is, the requestor agent and the collector agent are the same. The type of the memory-line related request might also be a different request than that sent in 112 and received in 114. Such a different request may be one of the additional requests sent by the manager to other agents as may be necessary based on the request sent in 112 and received in 114.

For example, the manager may determine that the request sent in 112 and received in 114 requires a rollback of at least one cache (memory) line of at least one cache of the agents, and thus sends additional requests to other agents. Rollback may be necessary when all the potential storage locations for a newly allocated cache line are already filled with other valid entries, such that one of these other cache lines must be rolled back to its home memory location to make space for the newly allocated line. In this situation, the manager preferably assigns the collector based on the global state of the caches of the agents, where the collector agent receives acknowledgments sent in response to the manager's rollback request to the agents of the caches where such cache lines need to be rolled back.

The global state of a given cache line is defined as the aggregate state of all the individual agent cache states for the given memory line considered collectively. The global cache state of a cache line is relative to which agent is the requestor. For instance, if two cases exist each of which have the exact same individual cache states, the global state can still be different if the requesting agent is different.

The local state of each individual cache may generally be one of invalid, shared, or modified. An invalid state means that the cache does not cache the memory line of interest. A shared state means that the cache caches this memory line, but the memory line has not been modified in this cache, and this cache is not the owner of the memory line. A modified state means that the cache caches the memory line, and the line has been modified in the cache, where the cache is the owner.

Similarly, the global state of the caches may be one of invalid, shared, dirty, and modified. An invalid global state means that no cache caches the memory line of interest. A shared global state means that one or more of the caches are storing the memory line, but none has modified it. A dirty global state means that exactly one of the caches has a modified copy of the memory line and is considered the owner of the memory line, and another one or more of the other caches is storing an exact copy of the modified memory line but is not the owner. The dirty global state implies that the line is stale in main memory and is unmodified relative to the cached copies. This state also implies that all caches have the same data, and that any attempt to modify the line requires that the shared copies be invalidated, where such attempts cause a transition to the modified global state.

A modified global state means that exactly one of the caches is storing and has modified the memory line, and none of the other caches is caching the memory line. The modified global state further implies that memory is stale, but that the owning agent will be allowed to modify the line further without the need for invalidations to other agents. The manager makes these decisions based on the global state and the identity of the requester, and the type of the request made.

Where the global state of the caches relative to the memory line of interest is dirty, the manager assigns as the collector agent the owning agent of the memory line, if the collector agent is not the same as the requestor agent that had sent the request in 112. The owning agent is defined as the agent having the cache in which this memory line has been modified. Where the global state of the caches relative to the memory line of interest is dirty, and where the owning agent of the memory line is the same as the requestor agent that had sent the request in 112, the manager assigns as the collector agent a new owning agent.

Once the collector agent has been assigned, the manager sends a message to the collector agent indicating that the collector agent is responsible for receiving acknowledgments (118). The manager preferably indicates in this message the number of acknowledgments that should be received by the collector agent. For instance, if two caches hold the memory line of interest, then the collector agent should receive two acknowledgments from the two agents of these caches. That is, the manager determines the number of agents holding affected cache lines in their caches, and these are the agents that send acknowledgments to the collector agent. The collector agent thus receives this message (120), and ultimately collects the indicated number of acknowledgments from the appropriate agents (122).

Technical Background

Figure 2:
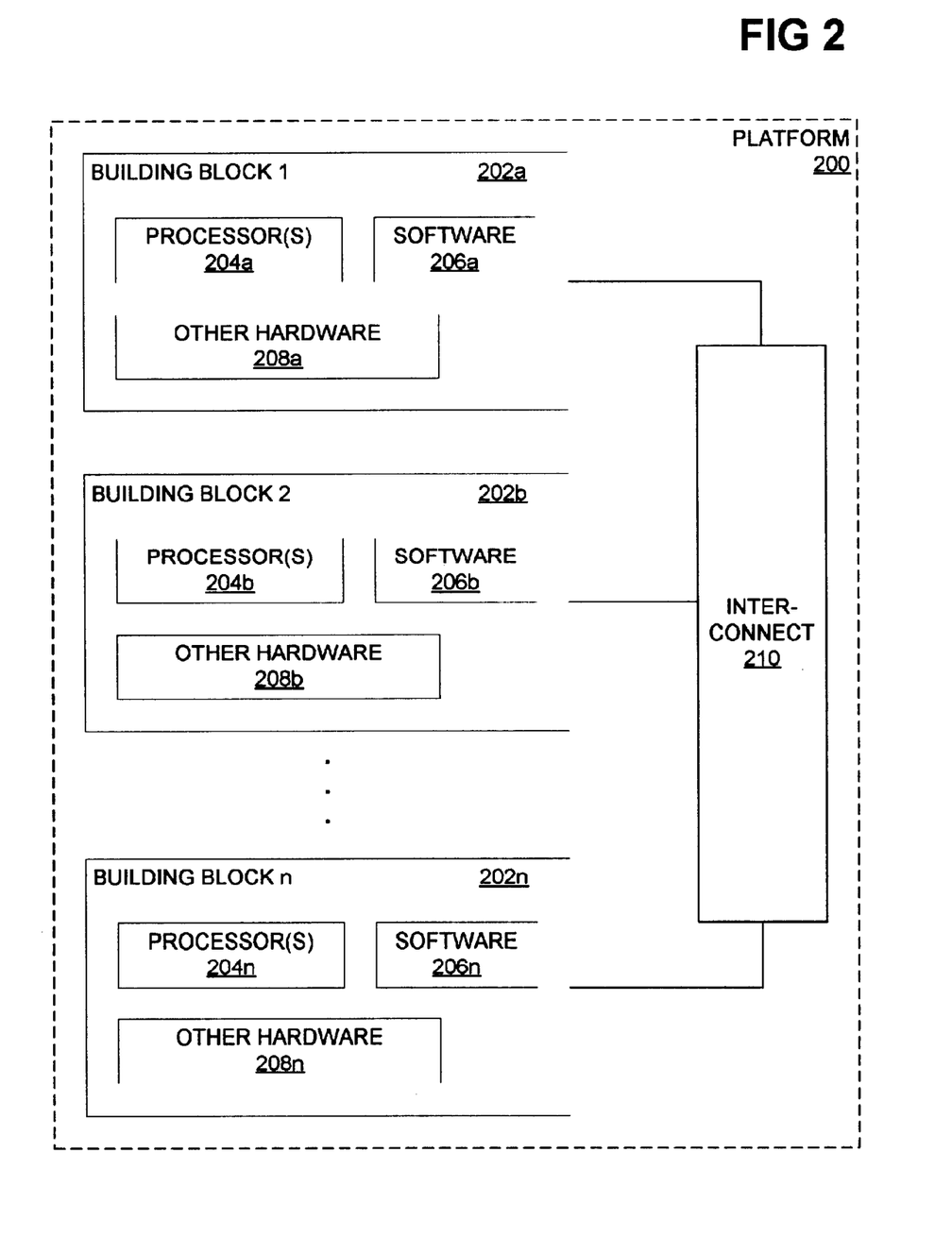
FIG. 2 is a diagram of an example platform having a number of example building blocks connected by an interconnect, in accordance with which embodiments of the invention may be practiced.

FIG. 2 shows an example platform 200 in conjunction with which embodiments of the invention may be practiced. The platform 200 includes a number of example building blocks 202a, 202b, . . . 202n, that are connected to one another via an interconnect 210. Each example building block has one or more processors, software, as well as other hardware, such as memory. For instance, the building block 202a has processor(s) 204a, software 206a, and other hardware 208a, whereas the building block 202b has processor (s) 204b, software 206b, and other hardware 208b. The building block 202n has processor(s ) 204n, software 206n, and other hardware 208n. A building block can be non-restrictively defined as a grouping of at least one or more processors and memory, although the invention is not so limited.

Figure 3:
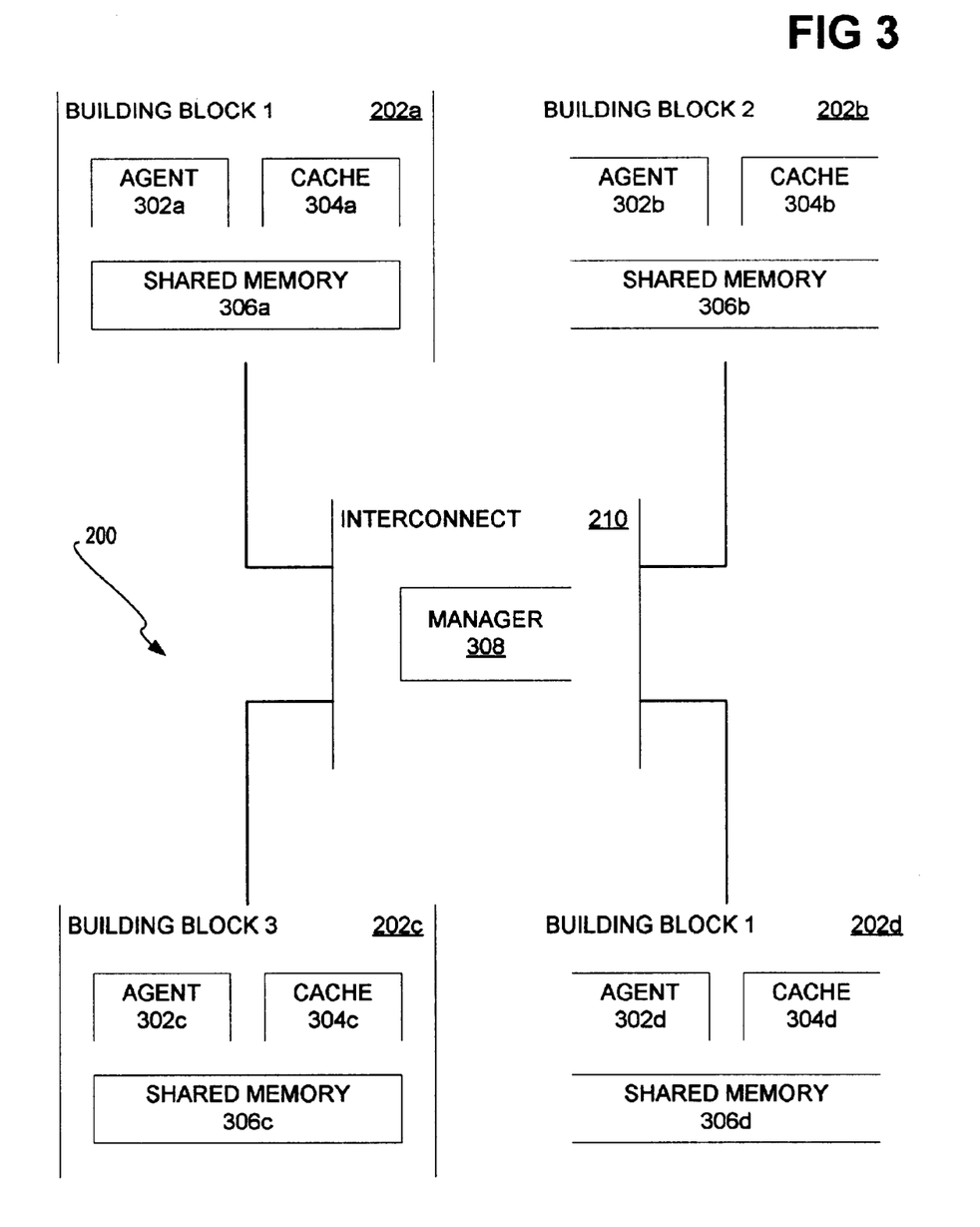
FIG. 3 is another diagram of the example platform of FIG. 2, in which different components of the building blocks and the interconnect are illustrated, and in accordance with which embodiments of the invention may be practiced.

FIG. 3 shows another view of the platform 200 of FIG. 2, specifically the case where there are four building blocks 202a, 202b, 202c, and 202d, connected to an interconnect 210. Each building block has an agent, a cache, and shared memory. That is, the building blocks 202a, 202b, 202c, and 202d have agents 302a, 302b, 302c, and 302d, respectively, caches 304a, 304b, 304c, and 304d, respectively, and shared memories 306a, 306b, 306c, and 306d, respectively. For descriptive convenience, the term building block 202 refers to any of the building blocks 202a, 202b, 202c, and 202d. Similarly, the term agent 302 refers to any of the agents 302a, 302b, 302c, and 302d, and the term cache 304 refers to any of the caches 304a, 304b, 304c, and 304d. Likewise, the term shared memory 306 refers to any of the shared memories 306a, 306b, 306c, and 306d.

The agent 302 is a processor or an I/O object, component, or other module that can generate and/or receive requests. The agent 302, for instance, may be a special-purpose application-specific integrated circuit (ASIC). The shared memory 306 is the memory of the building block 202 that is shared with all the other building blocks preferably as a single memory map. That is, a single memory map encompasses all the shared memories 306a, 306b, 306c, and 306d, such that an address of a memory line within the memory map refers to only one shared memory 306. The local or remote cache 304 is meant to temporarily store a limited number of memory lines of the shared memories.

As has been described, the cache 304 has a state, and all the caches 304a, 304b, 304c, and 304d have a global state. For a given memory line within memory map encompassing the shared memories 306a, 306b, 306c, and 306d, there can be a home agent or building block, one or more sharer agents or building blocks, and/or an owner agent or building block. The home agent or building block is defined as the agent or building block having the shared memory on which the given memory line actually resides. The sharer agents or building blocks are defined as the agents or building blocks that have cached, but have not modified, the given memory line in their caches. The owner agent or building block is defined as the agent or building block that has cached and has modified the given memory line in its cache.

The manager 308 of the interconnect 210 is also a processor or an I/O object, component or other module, that manages requests among the building blocks 202a, 202b, 202c, and 202d. It may also be a special-purpose ASIC. The interconnect 210, as well as the building blocks 202a, 202b, 202c, and 202d, may have other components and perform other functionalities not particularly described herein.

Figure 4:
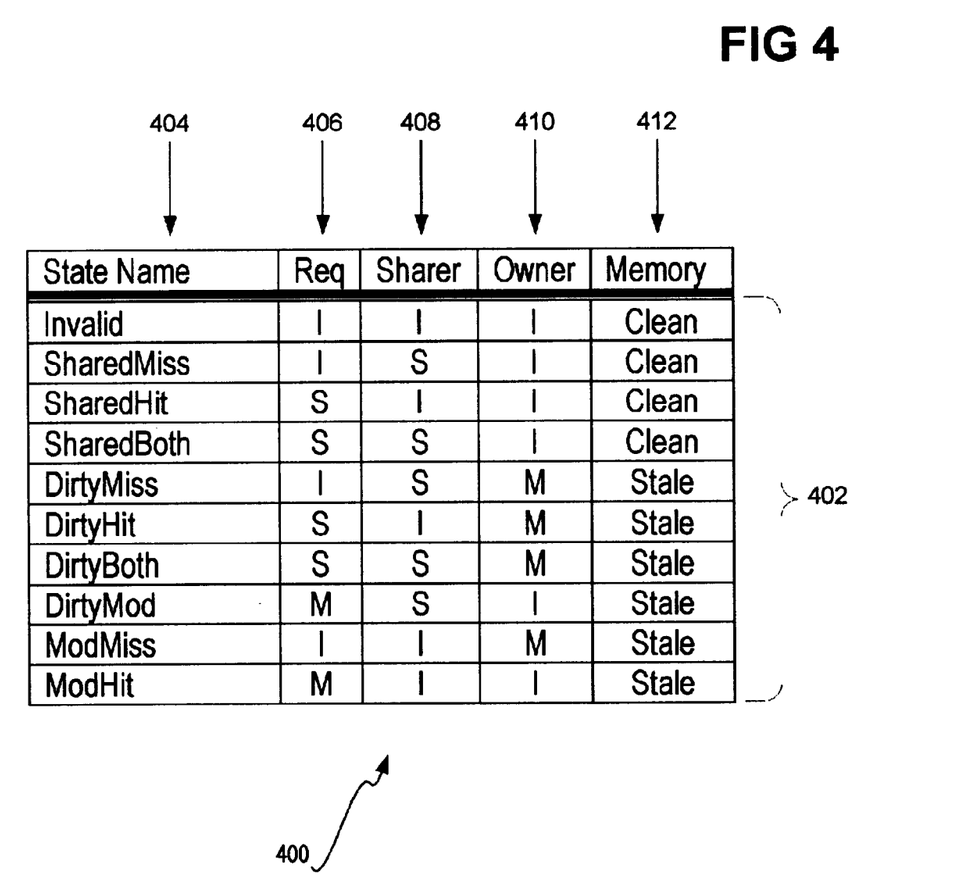
FIG. 4 is a diagram of a table of all the possible global states of the caches of the agents or the building blocks, according to an embodiment of the invention.

FIG. 4 shows a table 400 that shows in detail the possible global states of the caches 304a, 304b, 304c, and 304d of the building blocks 202a, 202b, 202c, and 202d. Each of the rows 402 represents a particular global state of the caches. The column 404 indicates the global state name. The columns 406, 408, and 410 indicate the states of the caches of the requestor agent, the sharer agent(s), and the owner agent, respectively. An I in the column 406, 408, or 410 indicates that the respective agent ha s not cached the memory line in question. An S in the column 406, 408, or 410 indicates that the respective agent has cached, but has not modified, the memory line in question. An M in the column 406, 408, or 410 indicates that the respective agent has cached and has modified the memory line in question. The column 412 indicates whether the memory line to which the global state of the caches relates is clean or stale. A clean memory line is one that still holds valid data, whereas a stale memory line is one that now holds out-of-date data, on account of the data having been modified in one or more of the caches of the agents.

Thus, an invalid global state is one in which neither the requestor, the sharer, or the owner agents has cached a given memory line. The memory line resides only at its home shared memory location, and is clean. A shared-miss global state means that there are only one or more sharer agents of the memory line, and the requestor agent itself has not cached the memory line. A shared-hit global state means that only the requestor agent has cached the memory line, whereas a shared-both global states means that the requestor agent, and one or more sharer agents, have cached the memory line. In all the shared global states, the memory line is clean.

A dirty-miss global state is one in which the requestor agent has not cached the memory line, but one or more sharer agents have, and an owner agent has modified the memory line in its cache. A dirty-hit global state is one in which the requestor agent has cached the memory line, and an owner agent has modified the memory line in its cache. A dirty-both global state is one in which the requestor agent and one or more sharer agents have cached the memory line, and an owner agent has modified the memory line in its cache. In all the dirty global states, the memory line is stale even though all cached copies are identical. In general, a write or read invalidate to a dirty line causes a transition to the modified global state.

A modified-miss global state means that an owner agent is the only agent caching the memory line, and it has modified the memory line. A modified-hit global state means that the requestor agent is the only agent caching the memory line, and it has modified the memory line. Thus, in the modified-hit global state, the requestor agent is in fact the owner agent. In all the modified global states, the memory line is stale. In general, a cache line read without invalidate of a modified-miss line causes a transition to a dirty-hit global state.

In the following four sub-sections of the detailed description, the responses of the manager to particular types of requests received from requestor agents are presented. One type of request includes cached read and read-invalidate requests. Another type of request includes uncached read requests. A third type of request includes uncached write requests. The final type of request relates to rollouts and rollbacks, where these terms are treated synonymously herein.

Cached Reads and Read-Invalidates

Figure 5:
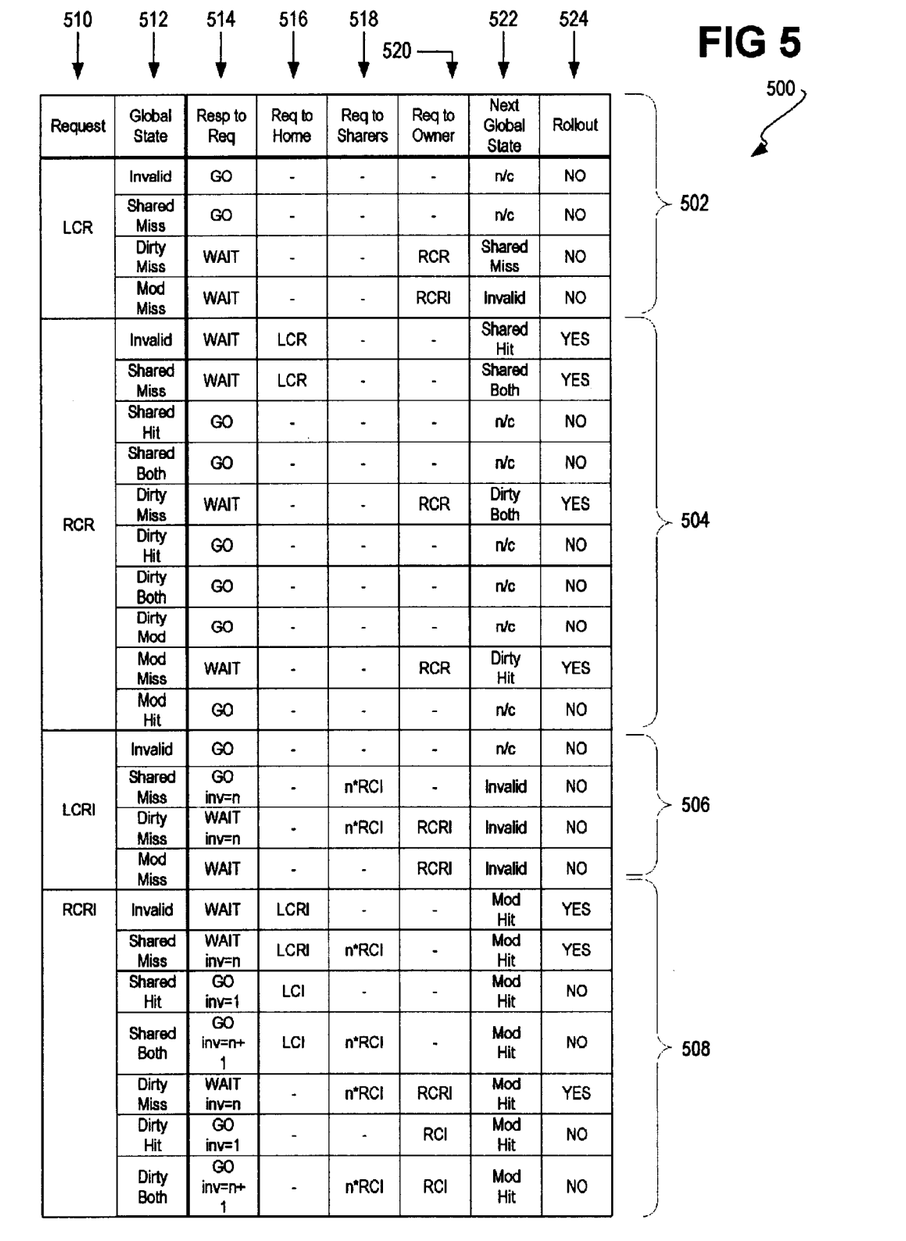
FIG. 5 is a diagram of a table showing how the manager responds to cached read and cached read-invalidate requests, according to an embodiment of the invention.
Figure 6:
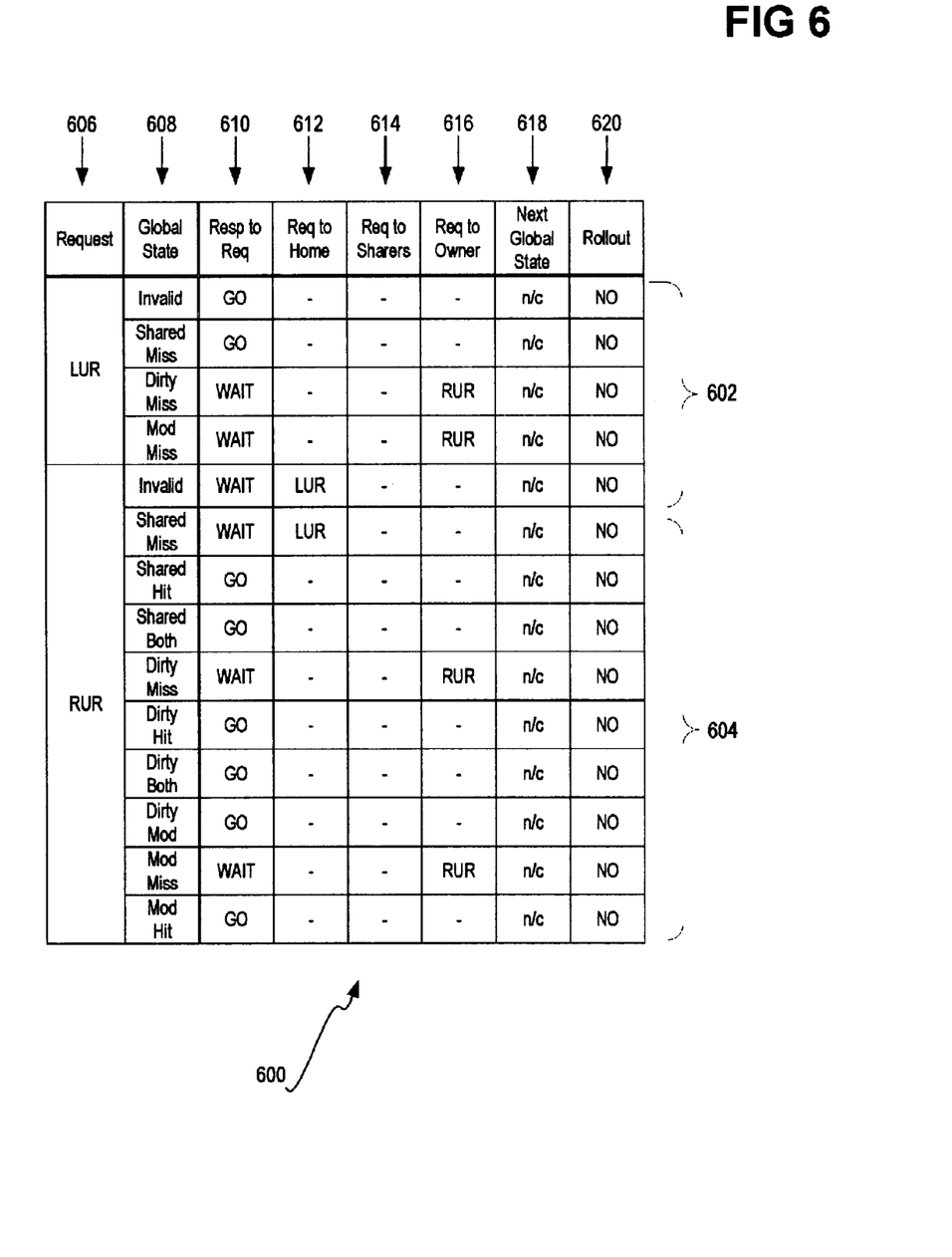

FIG. 5 shows a table 500 indicating how the manager, in one embodiment of the invention, processes cached read and read-invalidate requests received from requestor agents. There are specifically four types of such requests, indicated by the horizontal lines 502, the horizontal lines 504, the horizontal lines 506, and the horizontal lines 508. The horizontal lines 502 are for a cached read request from a requestor agent that relates to a shared memory line that is local to the requester agent, abbreviated as LCR for local cached read. That is, the memory line is stored at the shared memory of the request agent.

The horizontal lines 504 are for a cached read request from a requestor agent that relates to a shared memory line that is remote to the requestor agent, abbreviated as RCR for remote cache read. That is, the memory line is not stored at the shared memory of the requestor agent. The horizontal lines 506 are for a cached read-invalidate request from a requestor agent that relates to a shared memory line that is local to the requestor agent, abbreviated as LCRI for local cached read-invalidate. The horizontal lines 508 are for a cached-read invalidate request from a requestor agent that relates to a shared memory line that is remote to the requestor agent, abbreviated as RCRI for remote cached read-invalidate.

The column 510 indicates these types of requests, whereas the column 512 indicates the current global state of the cache that can exist for such requests. In response to a particular type of request in the column 510 for a particular cache global state in the column 512, the manager provides a response to the requestor agent as indicated in the column 514. The manager may also provide a request to the home agent as indicated in the column 516, a request to any sharer agents as indicated in the column 518, and a request to the owner agent as indicated in the column 520. The column 522 indicates what the next global state will be. Cache state changes are coincident with issuing all the requests and the response. The column 524 indicates whether cache rollback could be necessary. NO in the column 524 indicates rollback does not occur, whereas YES indicates that rollback may occur.

In the column 514, the manager may respond to the requestor agent with one or more of three different responses. A GO response indicates that the requestor agent can immediately use the data in its memory or cache, as appropriate. A WAIT response indicates that the requestor agent should wait for new data to be supplied from another agent. Furthermore, an inv=n or inv=n+1 indicates that the requestor agent has been assigned the collector agent for the request, and must wait for n or n+1 acknowledgments from other agents, where n is the number of sharer agents of the memory line in question.

In the columns 516, 518, and 520, the manager may also send requests to other agents, the home agent, the sharer agent(s), and the owner agent, respectively. A dash ("–") indicates that no such request is sent. An LCR request means that the manager sends a local cached read request to the appropriate agent, whereas an LCRI request means that the manager sends a local cached read-invalidate request to the appropriate agent. An RCR request means that the manager sends a remote cached read request, whereas an RCRI request means that the manager sends a remote its cached read-invalidate request. In the case of the column 518, n*RCI indicates that a number n of the RCI requests are sent, one to each sharer agent. An RCI request is an RCRI request where the resulting invalidation is with all zeros.

The column 522 indicates the next global state of the caches of the agents. That is, coincident with the response to the requestor agent indicated in the column 514, and coincident with requests sent to other agents as indicated in the columns 516, 518, and 520, the next global state of the caches is as is indicated in the column 522. The term "n/c" in column 522 indicates that there is no change in the next global state from the previous global state. Finally, the column 524 indicates whether the manager might need to rollout or rollback the cache line in the cache of the requesting agent.

Uncached Writes

Figure 7:
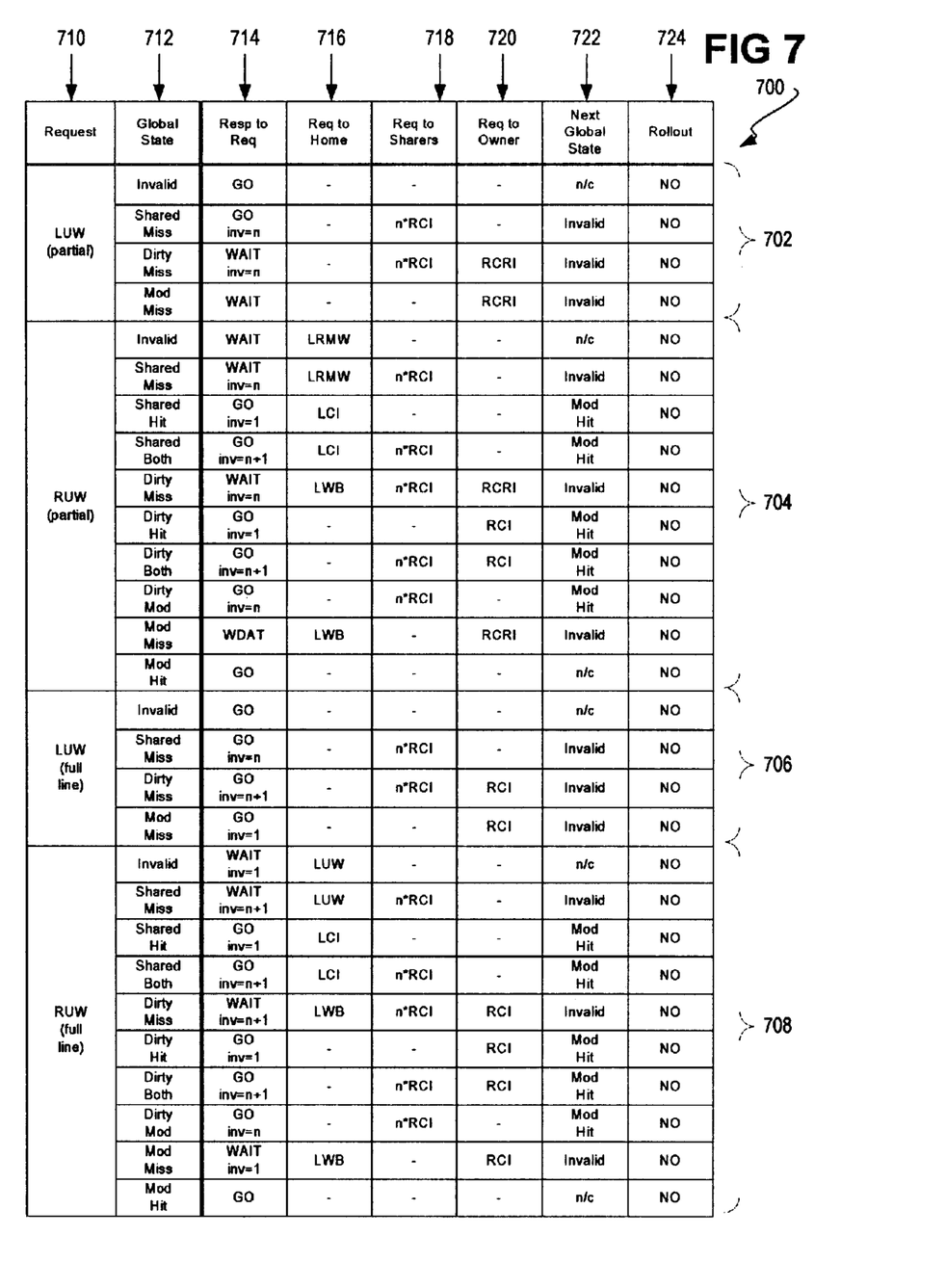
FIG. 7 is a diagram of a table showing how the manager responds to uncached write requests, according to an embodiment of the invention.

FIG. 7 shows a table 700 indicating how the manager, in one embodiment of the invention, processes cached uncached write requests received from requestor agents. There are specifically four types of such requests, indicated by the horizontal lines 702, the horizontal lines 704, the horizontal lines 706, and the horizontal lines 708. The horizontal lines 702 are for a partial local uncached write request from a requestor agent that relates to a shared memory line that is local to the requestor agent, abbreviated as LUW for local uncached write. The request is partial in that the request relates to only a part of a memory line, and not the full memory line.

The horizontal lines 704 are for a partial remote uncached write request from a requester agent that relates to a shared memory line that is remote to the requestor agent, abbreviated as RUW for remote uncached write. The horizontal lines 706 are for a full local uncached write request from a requestor agent that relates to a shared memory line that is local to the requestor agent. The request is full in that the request relates to a complete memory line, and not just part of the memory line. Finally, the horizontal lines 708 are for a full remote uncached write request from a requestor agent that relates to a shared memory line that is remote to the requestor agent.

The column 710 indicates these types of requests, whereas the column 712 indicates the current global state of the cache that can exist for such requests. In response to a particular type of request in the column 712 for a particular cache global state in the column 712, the manager provides a response to the requestor agent as indicated in the column 714. The manager also provides a request to the home agent as indicated in the column 716, a request to any sharer agents as indicated in the column 718, and a request to the owner agent as indicated in the column 720. The column 722 indicates what the next global state will be. Cache state changes are coincident with issuing all the requests and the response. The column 724 indicates whether cache rollback could be necessary, where NO means rollback is never necessary, and YES means a rollout is required if the selected way already is in use.

In the column 714, the manager may respond to the requestor agent with one or more of three different responses. A GO response indicates that the requestor agent can immediately use the data in its memory or cache, as appropriate. A WAIT response indicates that the requestor agent should wait for new data to be supplied from another agent. Furthermore, an inv=n or inv=n+1 indicates that the requestor agent has been assigned the collector agent for the request, and must wait for n or n+1 acknowledgments from other agents, where n is the number of sharer agents of the memory line in question.

In the columns 716, 718, and 720, the manager may also send requests to other agents, the home agent, the sharer agent(s), and the owner agent, respectively. A dash ("–") indicates that no such request is sent. An LRMW request means that the manager sends a cached read-modify-write request, whereas an LWB request means that the manager sends a full local line cached writeback request. In the LRMW case, a requestor performs a partial write and the current data is at a home agent, such that the manager issues an LRMW request to the home agent. This causes the home agent to read the current data and send it to the requestor, which merges the new data and sends it back to the home agent. The home agent then writes the merged data into memory.

In the LWB case, an LWB request is issued whenever the home agent will be receiving a cache line of data to be written into memory, which can occur for two different reasons. First, there may be a rollout. Second, there may be a partial uncached write where the current data is not at its home agent. In this latter case, the requestor receives the current data from the owning agent, merges it, and sends it back to the home agent. Since the home agent has received the LWB, it is expecting the merged data. An LCI request means that the manager sends a local cached invalidate request to the home agent, which means the home agent will invalidate all its processor's internal caches. The home agent does not cache local lines in its agent cache. An RCR request means that the manager sends a remote cached read request, whereas an RCRI request means that the manager sends a remote cached read-invalidate request. In the case of the column 718, n*RCI indicates that a number n of the RCI requests are sent, one to each sharer agent.

The column 722 indicates the next global state of the caches of the agents. That is, coincident with the response to the requester agent indicated in the column 714, and coincident with requests sent to other agents as indicated in the columns 716, 718, and 720, the next global state of the caches is as is indicated in the column 722. The term "n/c" in column 722 indicates that there is no change in the next global state from the previous global state. Finally, the column 724 indicates whether the might need to rollout or rollback the cache line in the cache of the requesting agent.

Rollbacks/Rollouts

Figure 8:
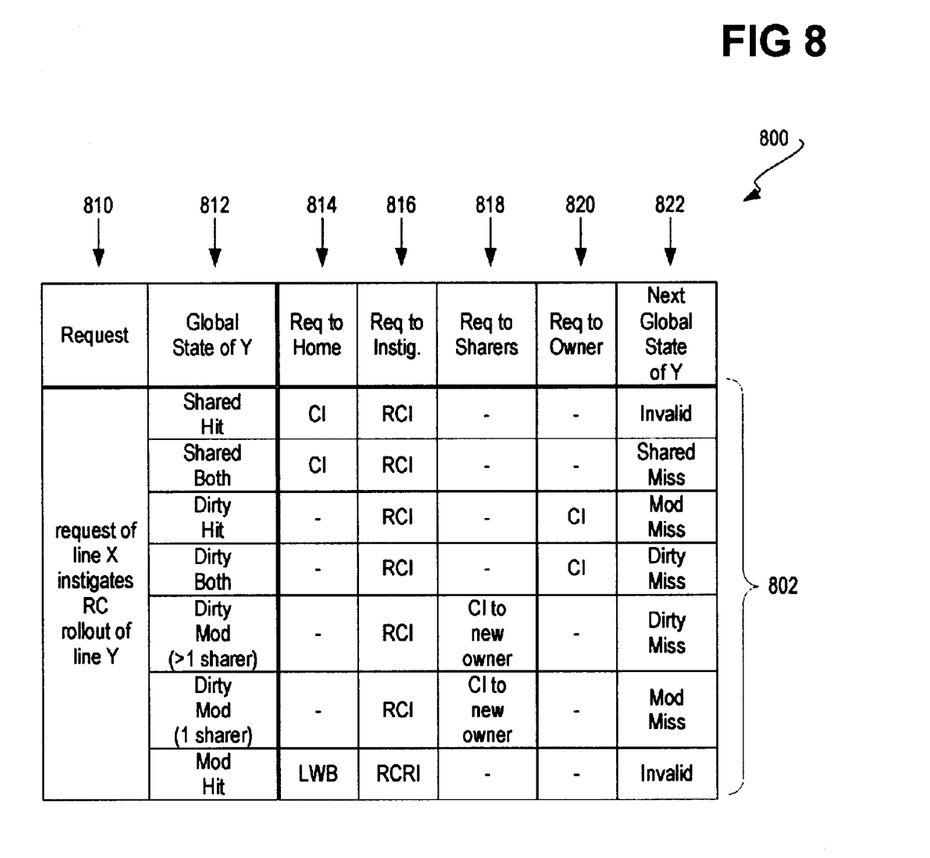
FIG. 8 is a diagram of a table showing how the manager responds to rollback or rollout requests, according to an embodiment of the invention.

FIG. 8 shows a table 800 indicating how the manager, in one embodiment of the invention, processes rollback or rollout requests. Such requests are not received from requestor agents, but rather are instigated by requestor agents whose requests cause the manager to issue rollbacks or rollouts on its behalf. Thus, as indicated by the horizontal lines 802, the request of a memory line X by a requestor agent instigates, or causes, the rollout of a memory line Y.

The column 810 indicates this rollback or rollout request, whereas the column 812 indicates the current global state of the caches relative to the memory line Y that can exist for such a request. The request for line X was the request that instigated a rollout of line Y, and the manager has used a cache-replacement algorithm for choosing line Y to replace. In response to the request in the column 810 for a particular cache global state in the column 812, the manager provides a request to the home agent of the memory line Y as indicated in the column 814. The manager also provides a request to the instigator agent, which is the requestor agent of the request that caused the rollback or rollout, as indicated in the column 816. The manager further provides a request to any sharer agents of the memory line Y as indicated in the column 818, and a request to the owner agent of the memory line Y as indicated in the column 820. The column 822 indicates the next global state of the-cache once these requests and responses have been performed.

In the columns 814, 816, 818, and 820, the manager may send one of three different requests. A dash ("–") indicates that no such request is sent. An LWB request means that the manager sends a full local line cached writeback request, whereas an RCRI request means that the manager sends a remote cached read-invalidate request. In this modified-hit case, the data returned by the instigator agent due to the RCRI is used as write data for the LWB by the home agent. An RCI request causes that agent to invalidate its cached copy and all copies in processor's internal caches. Finally, a CI request means that the manager sends a request to collect invalidate acknowledgments. The CI request implies that there is exactly one invalid that the collector agent must collect.

In the shared-hit and shared-both cases, the manager sends an RCI request to the instigator agent and a CI request to the home agent. In the dirty-hit and dirty-both cases, the manager sends an RCI to the instigator agent and a CI request to the owner agent. In the two dirty-modified cases, the manager sends an RCI to the instigator agent and a CI to one of the sharer agents. If only one sharer agents exists, then it becomes the new sole owner. If more than one sharer agents exists, the manager chooses one of them as the new owner, either arbitrarily or by using an algorithm. In the modified-hit case, the manager sends an RCRI to the instigator agent and an LWB to the home agent. The data returned by the instigator agent due to the RCRI is received by the home agent, which uses that data for its LWB request.

Advantages over the Prior Art

Embodiments of the invention allow for advantages over the prior art. Significantly, cache coherence and memory coherence are maintained and ensured by the dynamic assignment of collector agents in accordance with embodiments of the invention. Where the agents and the manager are hardware and not software, this means that cache and memory coherence is maintained outside of software. Therefore, the software running on a multi-processor system having such agents and such a manager benefit from automatic cache and memory coherence, in that the software itself does not have to take care of cache and memory coherence.

More specifically, cache coherence and consistency are maintained by the dynamic assignment of collector agents in accordance with embodiments of the invention as a result of the manner by which acknowledgment collection is distributed. The underlying principle for such distribution of acknowledgment collection is that the owner of a memory line is responsible for collecting the acknowledgments. This ensures that no processor or I/O device can read a new value of a line until other processors and other I/O devices have flushed the line from their caches. That is, no processor or I/O device can read a new value of a memory line until it is guaranteed that no one can read the old value.

Alternative Embodiments

It will be appreciated that, although specific embodiments of the invention have been described herein for purposes of illustration, various modifications may be made without departing from the spirit and scope of the invention. For instance, the invention is applicable to other types of multi-processor systems than that which have been described herein. Accordingly, the scope of protection of this invention is limited only by the following claims and their equivalents.

What is claimed is:

1. A method comprising:
   receiving a memory line-related request from a requestor agent among a plurality of agents, each agent having a shared memory to share among the plurality of agents and a cache to temporarily store a limited number of memory lines of the shared memories of other of the plurality of agents; and, dynamically assigning a collector agent among the plurality of agents for receiving one or more acknowledgements from one or more of the plurality of agents, based on at least one of a type of memory line-related request and a global state of the caches of the plurality of agents.

2. The method of claim 1, further comprising, after assigning the collector agent among the plurality of agents, sending a message to the collector agent indicating a total number of the one or more acknowledgments to be collected by the collector agent.

3. The method of claim 1, wherein dynamically assigning the collector agent comprises concluding that the type of memory line-related request is one of a write request and a read-invalidate request, and assigning the requestor agent of the request as the collector agent.

4. The method of claim 1, wherein dynamically assigning the collector agent among the plurality of agents comprises assigning the collector agent among the plurality of agents as a home agent of the plurality of agents, the shared memory of which a memory line to which the request is related resides, where the global state of the caches relative to the memory line is shared.

5. The method of claim 1, wherein dynamically assigning the collector agent among the plurality of agents comprises assigning the collector agent among the plurality of agents as an owning agent of the plurality of agents, the cache of which a modified copy of a memory line to which the request is related resides, where the global state of the caches relative to the memory line is dirty and the owning agent is different than the requestor agent of the request.

6. The method of claim 1, wherein dynamically assigning the collector agent among the plurality of agents comprises assigning the collector agent among the plurality of agents as a new owning agent of the plurality of agents, the cache of which a modified copy of a memory line to which the request is related resides, where the global state of the caches relative to the memory line is dirty and a current owning agent of the plurality of agents, the cache of which another modified copy of the memory line resides, is the requestor agent of the request.

7. The method of claim 1, further comprising collecting the one or more acknowledgments by the collector agent from the one or more of the plurality of agents.

8. A system comprising:
   a plurality of building blocks, each building block having an agent, a shared memory to share among the agents of other of the plurality of building blocks, and a cache to temporarily store a limited number of memory lines of the shared memories of the other of the plurality of building blocks; and, an interconnect interconnecting the plurality of building blocks and having a manager to dynamically assign a collector agent among the agents of the plurality of building blocks for receiving one or more acknowledgments from one or more of the agents, based on at least a type of a memory-line related request and a global state of the caches of the plurality of building blocks.

9. The system of claim 8, wherein the memory-line related request is one of a write request and a read-invalidate request, and the manager dynamically assigns the collector agent as a requesting agent of the agents of the plurality of building blocks of the memory-line related request.

10. The system of claim 8, wherein the memory-line related request results in rollback of at least one cache line of at least one cache of the plurality of building blocks, and the manager dynamically assigns the collector agent based on the global state of the caches of the plurality of building blocks.

11. The system of claim 8, wherein the memory-line related request results in rollback of at least one cache line of at least one cache of the plurality of building blocks, the global state of the caches is dirty, and the manager dynamically assigns the collector agent as one of a current owning agent of the agents of the plurality of building blocks and a new owning agent of the agents.

12. The system of claim 8, wherein the memory-line r elated request results in rollback of at least one cache line of at least one cache of the plurality of building blocks, the global state of the caches is dirty, and the manager dynamically assigns the collector agent as an owning agent of the agents of the plurality of building blocks different from a requestor agent of the agents of the request.

13. The system of claim 8, wherein the memory-line related request results in rollback of at least one cache line of at least one cache of the plurality of building blocks, the global state of the caches is dirty, and the manager dynamically assigns the collector agent as a new owning agent of the agents of the plurality of building blocks, a current owning agent of the agents being a requestor agent of the agents of the request.

14. The system of claim 8, wherein a s part of dynamically assigning the collector agent the manager indicates to the collector agent a total number of acknowledgments to collect from the one or more agents of the plurality of building blocks.

15. An article comprising:
   a computer-readable medium; and, means in the medium for dynamically assigning a collector agent among a plurality of a gents for receiving on e or more acknowledgments from one or more of the plurality of agents, based on at least one of a type of a memory-line related request and a global state of caches of the plurality of agents.

16. The article of claim 15, wherein the means dynamically assigns as the collector agent a requestor agent of the agents of the plurality of the building blocks of the memory-line related request where the memory-line related request is one of a write request and a read-invalidate request.

17. The article of claim 15, wherein the means dynamically assigns the collector agent based on the global state of the caches of the plurality of building blocks, where the memory-line related request results in rollback of at least one cache line of at least one cache of the plurality of building blocks.

18. The article of claim 15, wherein the means dynamically assigns the collector agent as one of a current owning agent of the agents of the plurality of building blocks and a new owning agent of the agents, where the memory-line related request results in rollback of at least one cache line of at least one cache of the plurality of building blocks, and the global state of the caches is dirty.

19. The article of claim 15, wherein the medium is a modulated carrier signal.

20. The article of claim 15, wherein the medium is a recordable data storage medium.

* * * * *